United States Patent [19]

Weaver et al.

[11] 3,982,037

[45] Sept. 21, 1976

[54] PEELING FRUITS AND VEGETABLES BY MULTIPLE HEATINGS AND COOLINGS

[75] Inventors: Merle L. Weaver, Martinez; Charles C. Huxsoll, Moraga; Robert P. Graham, El Cerrito, all of Calif.

[73] Assignee: The United States of America as represented by the Secretary of Agriculture, Washington, D.C.

[22] Filed: Jan. 15, 1975

[21] Appl. No.: 541,318

[52] U.S. Cl. ............................... 426/482; 426/506
[51] Int. Cl.² ........................................... A23L 1/212
[58] Field of Search ............ 426/482, 483, 506, 481, 426/520, 511; 99/584, 623, 536, 517, 540

[56] References Cited
UNITED STATES PATENTS

| | | | |
|---|---|---|---|
| 1,992,398 | 11/1931 | Ryder | 426/482 |
| 2,260,286 | 10/1941 | Allan | 99/536 |
| 2,910,392 | 10/1959 | Magnuson | 426/482 |
| 2,910,393 | 10/1959 | Magnuson et al. | 426/482 |
| 2,979,097 | 4/1961 | Rogers et al. | 99/584 X |
| 3,169,563 | 2/1965 | Hook | 99/584 |

OTHER PUBLICATIONS

Goose et al., "Tomato Paste and Other Tomato Products," Food Trade Press Ltd.; London, 1973.

*Primary Examiner*—S. Leon Bashore
*Assistant Examiner*—Steve Alvo
*Attorney, Agent, or Firm*—M. Howard Silverstein; William Takacs; David G. McConnell

[57] ABSTRACT

Novel process for peeling fruits and vegetables which yields maximum skin removal coupled with minimum weight loss. The primary feature of the invention is loosening the skin by applying multiple heat treatments, each followed by a cooling step. Each of the heatings is ineffective by itself to attain loosening of the skin, but the multiple heatings in aggregate and in conjunction with the coolings yield effective loosening of the skin without cooking the flesh of the fruit or vegetable being peeled.

6 Claims, No Drawings

PEELING FRUITS AND VEGETABLES BY MULTIPLE HEATINGS AND COOLINGS

DESCRIPTION OF THE INVENTION

The invention relates to and has among its objects the provision of novel processes for peeling fruits and vegetables. Further objects of the invention will be evident from the following description wherein parts and percentages are by weight unless otherwise specified.

In the following description, emphasis is directed to the peeling of tomatoes. This is by way of illustration and not limitation. In its broad compass the invention is applicable to all kinds of fruits and vegetables that are capable of skin-slipping. Certain fruits and vegetables have a layer of small cells just beneath the skin (epidermis), between it and the larger parenchyma cells which make up the flesh. When these fruits or vegetables are exposed to an appropriate degree of heat (for example, dipped in boiling water for about 1 to 2 minutes) these small cells are disrupted with the result that the skin can be readily slipped off the remainder of the fruit or vegetable. Examples of fruits and vegetables which are capable of skin-slipping are peaches, apricots, nectarines, plums, cherries, grapes, and tomatoes. Examples of fruits and vegetables which are not susceptible to skin-slipping are apples, pears, potatoes, sweet-potatoes, carrots, and beets.

In conventional practice in food processing plants, tomatoes are peeled by dipping them in hot lye (NaOH) solution, and then removing the loosened skin by wiping with rotating, soft rubber discs, or by flushing with jets of water. Although such lye-peeling procedure is effective, it presents several disadvantages. In the first place, high peeling losses occur because the caustic removes a substantial proportion of the softer tomato flesh as well as the peel. It is evident that high peeling losses are economically undesirable. Also, the peeled products do not have an attractive appearance because removal of some of the flesh exposes considerable vein-like yellow tissue. This is, of course, a disadvantage where the product is intended for canning as whole fruit. Another disadvantage of lye-peeling is that it yields a waste having a high NaOH content so that it is difficult to dispose of. Many communities require that the waste be neutralized prior to releasing it into sewage plants, and even such neutralization, which is a considerable expense, does not alter the detrimental effect of its high sodium content.

Although not used on a commercial scale, immersion in boiling water is an ancient method of peeling. Most cooks are familiar with the procedure wherein tomatoes are placed in boiling water for a period of 30 to 60 seconds, then taken out of the boiling water, cooled, and the loosened skin stripped off with the fingers under running water. This method of peeling is subject to many disadvantages despite the fact that no caustic is used. One disadvantage is that the process is operative only with market-type tomatoes--those with thin and easily removable skin. The process is not effective with the tomato varieties used in modern-day processing which are varieties specially bred for mechanical harvesting and which have tough and leathery skin. Another disadvantage is that the conditions required to obtain complete removal of the skin are severe enough to cause excessive and wasteful removal of tomato flesh. Although such waste can be tolerated in the home or other small operations, it is prohibitive on an industrial scale. In addition to the economical factors, the removal of tomato flesh yields a product of undesirable appearance so that it cannot be used for canning in the whole fruit form. On the other hand, if less strenuous conditions (such as a shorter immersion period) are employed, the peel is not adequately loosened and insufficient removal of the skin results. Accordingly, the product is not suitable for canning. Another problem is that immersion in boiling water for 30–60 seconds extracts valuable food components such as vitamins, sugars, and minerals, thus decreasing the nutritive value of the so-treated tomatoes. These disadvantages prompted the industry to turn to lye peeling, the drawbacks of which are less severe than those of the ancient single immersion boiling-water procedure.

The invention described herein provides a means for obviating the problems outlined above. The process of the invention enables effective removal of skin with minimum loss of flesh.

A further important advantage of the invention is that tomatoes and other produce can be effectively peeled without the use of caustic. Thereby peeling losses are kept to a minimum, and the resulting waste can be disposed more readily. For example, the waste can be dried and used as an animal feed or as a fertilizer.

Another advantage of the invention over known methods is that the appearance of the peeled product is improved. This is the case because little, if any, of the flesh is removed during the peeling process.

The benefits of the invention are obtained by subjecting tomatoes, or other produce, to multiple heat treatments, each of very short duration and each in the absence of caustic, and each heat treatment being followed by a cooling period. In this way we achieve the desired end of effectively heating only the skin and the cellular layer just beneath the skin with little or no cooking of the flesh. A special characteristic of the heat treatments is that each would be ineffective by itself in providing proper loosening of skin, whereas in the aggregate they do yield effective skin loosening.

An important advantage of the invention is that it does not require the use of any chemicals. Thus, all of the steps of the process--including the heating and cooling steps and the skin removal step--are conducted in the absence of any caustic or acid. In essence, the heating and cooling steps of the invention are purely thermal operations involving application and abstraction of heat, respectively. The skin removal step is a purely mechanical one involving physical separation of the loosened skin.

A further important advantage of the invention is that it provides excellent results even when applied to tomato varieties especially bred for mechanical harvesting.

DETAILED DESCRIPTION OF THE INVENTION

In accordance with the invention a product selected from the group consisting of fruits and vegetables which are capable of skin slipping is subjected to repeated steps of heating and cooling. This causes the skin to become loosened and the loosened skin is then removed by mechanical action, for example, by application of wiping or rubbing action to the product. Each of the heating steps is conducted under such conditions that each is ineffective by itself to attain loosening of the skin on the product, but the repeated steps of heating in the aggregate and in conjunction with the cooling steps yield effective loosening of the skin without cooking of the flesh. Thus when the loosened skin is removed, we obtain a superior end product, that is, one wherein the skin has been totally removed with minimum loss of flesh. The conditions used in the heating steps will vary depending on many factors such as kind of product and the maturity thereof and the manner in which heat is applied thereto, for instance, whether heat is applied by means of hot water, steam, or radiant energy. Under the circumstances it is not practicable to set forth any numerical limits which would be applicable to all situations. Examples of particular embodiments, however, are set forth below. The cooling steps are a critical feature of the invention as they minimize transfer of heat from the skin to the flesh. During each heating step heat is applied to the outer surface of the product and if precautions are not taken so much heat would then be transferred to the flesh that cooking thereof would take place with the end result that flesh would be removed in the final step where the loosened skin is removed. However, by applying cooling this transfer of heat is minimized. For best results, it is preferred that each cooling step be applied without delay after completion of each preceding heating step. The conditions used in the cooling steps will vary depending on such factors as the kind and maturity of the product, the temperature applied in the preceding step, and the manner in which the cooling is accomplished, for example, whether heat is abstracted by contact with air or with water. Obviously, water is a better heat conductor than air so that contact with it requires a shorter time. In general, we have attained good results where each cooling step is conducted by contacting the product with a cooling medium (e.g., air or water at about 30° to 75° F.) for a period of about 1 to 5 minutes. Our investigations have demonstrated that excellent results are obtained by applying two heating and two cooling steps (in the sequence heating-cooling-heating-cooling) prior to skin removal. It is within the compass of the invention, however, to apply more of these steps but always in the sequence heating-cooling-heating-cooling - - -.

Particular embodiments of the invention are next set forth, using the peeling of tomatoes as an illustration.

PARTICULAR EMBODIMENTS OF THE INVENTION

I. In a practice of the invention the tomatoes are first heated. This is best done by immersing them in hot water. Generally, the temperature of the water is about 212° F. (boiling point). Contact between the hot water and tomatoes is continued for about 5 to 10 seconds. It is important to note that the time of contact for maximum effect is dependent on the nature of the material to be peeled, particularly the type of fruit or vegetable and the maturity thereof. As a general rule, the conditions should be adjusted so as to obtain heating primarily of the skin and underlying small cells without any substantial heating of the flesh.

Although immersion in boiling water is the preferred procedure, it is within the compass of the invention to heat by other means. For example, steam may be applied to the tomatoes for 5 to 20 seconds. Alternatively, the tomatoes may be exposed to radiation from an infrared heater. Usually, heating by this means will be continued for 5 to 30 seconds.

II. Next, the so-heated tomatoes are cooled by holding them at ambient temperature for a period of 1 to 5 minutes. Alternatively, the tomatoes may be cooled by immersing them in water at a temperature of about 30°–70° F. for a period of 1 to 5 minutes. The particular conditions employed are again subject to the maturity and type of fruit or vegetable being processed. Basically, the produce is held for a period long enough for the skin and underlying tissue to cool and prevent cooking of the flesh.

III. The tomatoes are again heated as described in Part I, above. Thus the tomatoes can be immersed in hot water at 212° F. for a period of 5 to 10 seconds. Alternatively, steam may be applied to the tomatoes for a period of 5 to 20 seconds. Another alternative is to expose them to an infrared heater for 5 to 30 seconds. Generally, the conditions will depend on the nature and maturity of the material to be peeled, and the heating will be insufficient by itself to produce effective loosening of the skin. Again, application of heat should be limited to the skin and underlying small cells; cooking of the flesh must be avoided.

IV. The tomatoes are again subjected to cooling under the same conditions and for the same purposes as described in Part II. Thus, the heated tomatoes can be held at ambient temperature for 1 to 5 minutes, or they may be immersed in water at 30°–70° F. for 1 to 5 minutes.

V. Following the second cooling step, the loosened skins are removed by any appropriate method well-known in the art. A preferred method is to remove the loosened peels by non-abrasive dry wiping action of rotating discs of soft, flexible rubber as described by Hart et al in U.S. Pat. No. 3,618,651.

It is within the broad purview of the invention to employ a third heating step followed by a cooling step, these being applied prior to removal of the skin and after the cooling period of Step IV. The conditions of these additional heating and cooling steps are the same as those set forth above in I-IV, above.

EXAMPLES

The invention is further demonstrated by the following illustrative examples.

EXAMPLE 1

A batch of tomatoes (Variety 105-J, a variety bred for mechanical harvesting) was divided into several lots, each lot being treated as follows:

Lot A: The tomatoes were weighed and then immersed in boiling water at 212° F. for 10 seconds. The tomatoes were removed from the water and cooled at ambient temperature for 3 minutes. Then, the tomatoes were immersed in boiling water again for 10 seconds, were removed and cooled in air at ambient temperature for 1 minute, and the loosened skin was removed by non-abrasive wiping action. The so-treated tomatoes were weighed and the difference in weight was designated as the peel loss.

It is important to note that a low value for peel loss does not necessarily mean tht efficient peeling has occurred. Some of the peel may remain on the surface of the tomato. Good peeling occurs when all of the tomato peel is removed with little or no removal of tomato flesh. Consequently, both the precentage of peel loss and the extent of peeling are listed in Table 1. Furthermore, the appearance of the peeled material is also evaluated.

The extent of peeling is rated as total (complete removal of peel) or partial (incomplete removal of peel). The appearance is rated as excellent, good, fair, or poor, depending upon the amount of flesh removed by the treatment. A rating of excellent means that no flesh was removed, whereas a rating of poor indicates substantial removal of flesh.

Lot B: the above precedure was repeated with the following exception: The first cooling was conducted by immersing the heated tomatoes in water at 67° F. for 3 minutes.

Lot C: The procedure described for Lot A was employed with the exception that the first cooling was conducted by immersing the heated tomatoes in water at 34° F. for 3 minutes.

Two lots (D and E) were treated in accordance with known procedures for purposes of comparison. It should be obvious that these procedures are not illustrative of the invention.

Lot D: After weighing, the tomatoes were immersed in aqueous sodium hydroxide (18%) at 212° F. for 23 seconds. The tomatoes were removed from the caustic, cooled with tap water, the loosened skin removed as previously described, and weighed.

Lot E: After weighing, these tomatoes were immersed in boiling water for a period of 30 seconds. The tomatoes were removed, cooled with tap water, the loosened skin removed as previously described, and weighed.

The results are summarized in Table 1.

Table 1

|  |  | Lot A | Lot B | Lot C | Lot D* | Lot E* |
|---|---|---|---|---|---|---|
| 1st Heating | Medium | Water | Water | Water | 18% NaOH | Water |
|  | Temp. °F. | 212 | 212 | 212 | 212 | 212 |
|  | Time, sec. | 10 | 10 | 10 | 23 | 30 |
| 1st Cooling | Medium | Air | Water | Water | Water | Water |
|  | Temp. °F. | Ambient | 67 | 34 | 67 | 67 |
|  | Time, min. | 3 | 3 | 3 | 1 | 1 |
| 2nd Heating | Medium | Water | Water | Water | — | — |
|  | Temp. °F. | 212 | 212 | 212 | — | — |
|  | Time, sec. | 10 | 10 | 10 | — | — |
| 2nd Cooling | Medium | Air | Air | Air | — | — |
|  | Temp. °F. | Ambient | Ambient | Ambient | — | — |
|  | Time, min. | 1 | 1 | 1 | — | — |
| Peel loss, % |  | 9.0 | 8.4 | 8.0 | 14.8 | 12.2 |
| Extent of peeling |  | Total | Total | Total | Total | Partial |
| Appearance |  | Excellent | Excellent | Excellent | Poor | Fair |

*Not illustrative of the invention; provided for purpose of comparison.

EXAMPLE 2

A batch of tomatoes (Variety 105-J) was divided into two lots, each lot being treated as follows:

Lot A: The tomatoes were weighed and then immersed in boiling water at 212° F. for 5 seconds. The tomatoes were removed from the water and cooled in air at ambient temperature for 2 minutes. Then, the tomatoes were immersed in boiling water at 212° F. for 5 seconds, were removed, and were cooled in air at ambient temperature for 2 minutes. The tomatoes were immersed again in boiling water at 212° F. for 10 seconds, were removed, were cooled in air at ambient temperature for 1 minute, and the loosened skin removed as previously described. The peel loss was calculated and the extent of peeling and appearance of the so-treated tomatoes were evaluated.

Lot B: The above procedure was repeated with the following exceptions. The first and second cooling periods were conducted by immersing the heated tomatoes in water at 67° F. for 2 minutes.

The results are summarized in Table 2.

Table 2

|  |  | Lot A | Lot B |
|---|---|---|---|
| 1st Heating | Medium | Water | Water |
|  | Temp. °F. | 212 | 212 |
|  | Time, sec. | 5 | 5 |
| 1st Cooling | Medium | Air | Water |
|  | Temp. °F. | Ambient | 67 |
|  | Time, min. | 2 | 2 |
| 2nd Heating | Medium | Water | Water |
|  | Temp. °F. | 212 | 212 |
|  | Time, sec. | 5 | 5 |
| 2nd Cooling | Medium | Air | Water |
|  | Temp. °F. | Ambient | 67 |
|  | Time, min. | 2 | 2 |
| 3rd Heating | Medium | Water | Water |
|  | Temp. °F. | 212 | 212 |
|  | Time, sec. | 10 | 10 |
| 3rd Cooling | Medium | Air | Air |
|  | Temp. °F. | Ambient | Ambient |
|  | Time, min. | 1 | 1 |
| Peel loss, % |  | 7.8 | 7.0 |
| Extent of peeling |  | Total | Total |
| Appearance |  | Excellent | Excellent |

EXAMPLE 3

A batch of Satsuma plums was divided into two lots, each lot being treated as follows:

Lot A: The plums were weighed and then immersed in boiling water at 212° F. for 10 seconds. The plums were removed from the water and immersed in water at 67° F. for 1 minute. Then, the plums were placed in boiling water for 10 seconds, were removed, and were immersed in water at 67° F. for 1 minute. Again the plums were immersed in boiling water for 10 seconds, were removed, were held in air at ambient temperature for 1 minute., and then the loosened skin was removed as previously described. The peel loss was calculated and the extent of peeling and appearance of the peeled plums were evaluated.

The other lot of plums (Lot B) was not treated in accordance with the invention. For purposes of comparison these plums were immersed in boiling water at 212° F. for 30 seconds in accordance with known procedures. After cooling in tap water, the loosened skin was removed and the products were evaluated as in Lot A.

The results are summarized in Table 3.

Table 3

|  |  | Lot A | Lot B* |
|---|---|---|---|
| 1st Heating | Medium | Water | Water |
|  | Temp. °F. | 212 | 212 |

Table 3-continued

| | | Lot A | Lot B* |
|---|---|---|---|
| 1st Cooling | Time, sec. | 10 | 30 |
| | Medium | Water | Water |
| | Temp. °F. | 67 | 67 |
| | Time, min. | 1 | 1 |
| 2nd Heating | Medium | Water | — |
| | Temp. °F. | 212 | — |
| | Time, sec. | 10 | — |
| 2nd Cooling | Medium | Water | — |
| | Temp. °F. | 67 | — |
| | Time, min. | 1 | — |
| 3rd Heating | Medium | Water | — |
| | Temp. °F. | 212 | — |
| | Time, sec. | 10 | — |
| 3rd Cooling | Medium | Air | — |
| | Temp. °F. | Ambient | — |
| | Time, min. | 1 | — |
| Peel loss, % | | 7.2 | 14.1 |
| Extent of peeling | | Total | Partial |
| Appearance | | Excellent | Fair |

*Not illustrative of the invention; provided for purpose of comparison.

Having thus described our invention, we claim:

1. A process for peeling a product selected from the group of fruits and vegetables which are capable of skin-slipping, which comprises subjecting the product to multiple heatings at a temperature of 212° F, each in the absence of any caustic or acid, subjecting the product to cooling at a temperature of about 30° to 75° F. for a period of about 1 to 5 minutes, in the absence of any caustic or acid, immediately following each heating, wherein each of said heatings is ineffective by itself to attain loosening of the skin on the product, but wherein the said multiple heatings in the aggregate and in conjunction with the subsequent coolings yield effective loosening of the skin without cooking of the flesh of the product, and removing the so-loosened skin from the product.

2. The process of claim 1 wherein the multiple heatings are each carried out by immersing the product in water at 212° F. for about 5 to 10 seconds.

3. The process of claim 1 wherein the heatings and coolings are each two in number.

4. The process of claim 1 wherein the heatings and coolings are each three in number.

5. The process of claim 1 wherein the product is tomato.

6. The process of claim 1 wherein the product is plum.

* * * * *